(12) United States Patent
Pursche et al.

(10) Patent No.: US 8,474,862 B2
(45) Date of Patent: Jul. 2, 2013

(54) MOTOR VEHICLE SEAT ARRANGEMENT AND METHOD FOR PROTECTING A VEHICLE OCCUPANT

(75) Inventors: Oliver Pursche, Ulm (DE); Hans-Peter Sendelbach, Senden (DE); Martin Breuninger, Neu-Ulm (DE); Hiroshi Nozu, Shiga (JP); Werner Geiselhart, Dornstadt (DE); Edwin Miller, Ulm (DE); Thomas Sievers, Ulm (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 12/585,404

(22) Filed: Sep. 14, 2009

(65) Prior Publication Data

US 2010/0090448 A1    Apr. 15, 2010

Related U.S. Application Data

(63) Continuation of application No. PCT/EP2008/053027, filed on Mar. 13, 2008.

(30) Foreign Application Priority Data

Mar. 15, 2007 (DE) .......................... 10 2007 013 106
Nov. 23, 2007 (DE) .......................... 10 2007 057 016

(51) Int. Cl.
*B60R 21/207* (2006.01)

(52) U.S. Cl.
USPC ............... 280/730.2; 280/729; 280/743.2; 297/284.9; 297/216.13; 297/452.41

(58) Field of Classification Search
USPC ...... 280/730.2, 729, 743.1, 743.2; 297/284.6, 297/284.9, 216.13, 452.41

IPC ..................................................... B60R 21/207
See application file for complete search history.

(56) References Cited

U.S. PATENT DOCUMENTS 3,623,768 A    11/1971    Capener et al.
4,589,695 A    5/1986    Isono (Continued)

FOREIGN PATENT DOCUMENTS

CA    2229873    2/1997
CN    1760065 A    4/2006

(Continued)

OTHER PUBLICATIONS

Gamache, S.T., "Development of a Lateral Acceleration Compensating Seat," SAE Technical Papers Series 940216, 1994.

(Continued)

*Primary Examiner* — Joseph Rocca
*Assistant Examiner* — Keith Frisby
(74) *Attorney, Agent, or Firm* — Foley & Lardner LLP

(57) ABSTRACT

A motor vehicle seat arrangement for a motor vehicle. The seat arrangement comprising a vehicle seat, at least one inflatable element, means for inflating the inflatable element which inflate the inflatable element depending on a control signal. The vehicle seat arrangement is arranged in the vehicle and the inflatable element is designed and arranged in or on a side wall of a backrest of the vehicle seat in a way that it exerts a momentum on the upper part of the body of the vehicle occupant while it is inflated in answer to the control signal, so that the whole vehicle occupant is moved away from a collision section of the vehicle that collides or is going to collide with the object or that the thorax region of the upper part of the body of the vehicle occupant performs a tilting movement away from the collision section of the vehicle.

12 Claims, 9 Drawing Sheets

U.S. PATENT DOCUMENTS

| | | | |
|---|---|---|---|
| 4,655,505 A | 4/1987 | Kashiwamura et al. | |
| 4,885,827 A | 12/1989 | Williams | |
| 4,965,899 A | 10/1990 | Sekido et al. | |
| 5,280,997 A | 1/1994 | Andres et al. | |
| 5,290,084 A | 3/1994 | Sinnhuber | |
| 5,531,470 A | 7/1996 | Townsend | |
| 6,037,731 A | 3/2000 | Fruehauf et al. | |
| 6,203,105 B1 * | 3/2001 | Rhodes, Jr. | 297/284.6 |
| 6,250,676 B1 | 6/2001 | Werstat et al. | |
| 6,332,651 B1 | 12/2001 | Horisawa | |
| 6,343,810 B1 | 2/2002 | Breed | |
| 6,588,838 B1 | 7/2003 | Dick et al. | |
| 6,629,715 B2 | 10/2003 | Oh et al. | |
| 6,896,325 B2 * | 5/2005 | Takedomi et al. | 297/216.1 |
| 7,114,744 B2 | 10/2006 | Sunabashiri | |
| 7,341,275 B2 | 3/2008 | Miyake et al. | |
| 7,717,459 B2 | 5/2010 | Bostrom et al. | |
| 7,726,733 B2 | 6/2010 | Balser et al. | |
| 2001/0011812 A1 | 8/2001 | Seki et al. | |
| 2002/0021033 A1 | 2/2002 | Bayer et al. | |
| 2002/0060447 A1 | 5/2002 | Acker et al. | |
| 2002/0166710 A1 | 11/2002 | Breed | |
| 2003/0222489 A1 | 12/2003 | Takedomi et al. | |
| 2004/0135356 A1 | 7/2004 | Katsuda et al. | |
| 2004/0232666 A1 | 11/2004 | Sato et al. | |
| 2005/0024255 A1 | 2/2005 | Chuey | |
| 2005/0035634 A1 | 2/2005 | Dauber et al. | |
| 2005/0070414 A1 | 3/2005 | Schneider et al. | |
| 2005/0161921 A1 | 7/2005 | Higuchi | |
| 2005/0173902 A1 | 8/2005 | Boxey | |
| 2005/0230173 A1 | 10/2005 | Heuschmid et al. | |
| 2006/0131848 A1 | 6/2006 | Miyake et al. | |
| 2006/0196715 A1 | 9/2006 | Fujishiro et al. | |
| 2006/0255572 A1 * | 11/2006 | Svenbrandt et al. | 280/730.2 |
| 2007/0057493 A1 | 3/2007 | Ritzel et al. | |
| 2007/0200323 A1 | 8/2007 | Bertele et al. | |
| 2007/0252368 A1 | 11/2007 | Balser et al. | |
| 2009/0008914 A1 | 1/2009 | Breuninger et al. | |
| 2009/0230742 A1 | 9/2009 | Habegger et al. | |
| 2010/0090448 A1 | 4/2010 | Pursche et al. | |
| 2011/0169250 A1 | 7/2011 | Breuninger et al. | |

FOREIGN PATENT DOCUMENTS

| | | |
|---|---|---|
| DE | 35 41 537 A1 | 6/1986 |
| DE | 38 04 959 A1 | 8/1989 |
| DE | 40 34 121 A1 | 10/1991 |
| DE | 40 32 381 A1 | 4/1992 |
| DE | 196 05 779 A1 | 7/1996 |
| DE | 196 14 314 A1 | 10/1996 |
| DE | 196 48 654 A1 | 5/1998 |
| DE | 298 15 521 U1 | 1/1999 |
| DE | 198 58 209 C1 | 4/2000 |
| DE | 198 51 456 A1 | 5/2000 |
| DE | 199 38 698 A1 | 2/2001 |
| DE | 200 17 919 U1 | 3/2001 |
| DE | 199 50 702 A1 | 4/2001 |
| DE | 199 46 406 A1 | 5/2001 |
| DE | 100 57 151 A1 | 6/2001 |
| DE | 100 46 745 C1 | 2/2002 |
| DE | 101 56 400 C1 | 4/2003 |
| DE | 203 06 153 U1 | 8/2003 |
| DE | 10 2 14 383 A1 | 10/2003 |
| DE | 203 07 535 U1 | 10/2003 |
| DE | 203 16 865 U1 | 3/2004 |
| DE | 600 12 916 T2 | 12/2004 |
| DE | 10 2004 002 809 A1 | 8/2005 |
| DE | 10 2004 005 412 A1 | 8/2005 |
| DE | 10 2004 012 880 A1 | 10/2005 |
| DE | 10 2004 017 650 A1 | 10/2005 |
| DE | 20 2005 015 840 U1 | 3/2006 |
| DE | 10 2005 002 464 A1 | 7/2006 |
| DE | 10 2005 002 466 A1 | 7/2006 |
| DE | 10 2005 031 545 A1 | 1/2007 |
| DE | 102006037521 A1 * | 5/2007 |
| DE | 10 2005 059 997 A1 | 6/2007 |
| DE | 20 2005 021 200 U1 | 6/2007 |
| DE | 10 2005 032 033 A1 | 8/2007 |
| DE | 10 2005 062 849 A1 | 9/2007 |
| DE | 10 2006 014 381 A1 | 10/2007 |
| DE | 20 2007 010 364 U1 | 12/2007 |
| DE | 10 2007 013 105 A1 | 9/2008 |
| DE | 10 2007 013 106 A1 | 9/2008 |
| DE | 10 2007 013 543 A1 | 9/2008 |
| DE | 10 2007 057 016 A1 | 5/2009 |
| EP | 0 470 413 B1 | 2/1992 |
| EP | 0 913 294 B1 | 5/1999 |
| EP | 0 980 796 A2 | 2/2000 |
| EP | 1 176 049 A2 | 1/2002 |
| EP | 1 369 314 A | 12/2003 |
| EP | 1 518 763 A1 | 3/2005 |
| EP | 1 547 875 A1 | 6/2005 |
| EP | 1 559 622 A2 | 8/2005 |
| EP | 1 581 413 B1 | 10/2005 |
| EP | 1 591 323 A1 | 11/2005 |
| EP | 1 698 521 A1 | 9/2006 |
| FR | 2761310 | 10/1998 |
| FR | 2884464 | 10/2006 |
| GB | 2 397 047 A | 7/2004 |
| JP | 60-234037 A | 11/1985 |
| JP | 63-5846 | 1/1988 |
| JP | 11 078 767 A | 3/1999 |
| JP | 2002-362295 A | 12/2002 |
| JP | 2004-9798 | 1/2004 |
| JP | 2004-189187 | 7/2004 |
| JP | 2005-022596 A | 1/2005 |
| JP | 2005-067520 A | 3/2005 |
| JP | 2006-240544 A | 9/2006 |
| JP | 2006-524161 | 10/2006 |
| RU | 98 103 391 A | 1/2000 |
| WO | WO 00/12350 A1 | 3/2000 |
| WO | WO 00/27666 A2 | 5/2000 |
| WO | WO 01/28819 A1 | 4/2001 |
| WO | WO-02/43993 A1 | 6/2002 |
| WO | WO 03/033294 A1 | 4/2003 |
| WO | WO 2005/092673 A2 | 10/2005 |
| WO | WO 2006/077007 A1 | 7/2006 |
| WO | WO 2007/003406 A1 | 1/2007 |
| WO | WO 2007/009270 A1 | 1/2007 |
| WO | WO 2007/009274 A2 | 1/2007 |
| WO | WO 2007/022766 A1 | 3/2007 |
| WO | WO-2007/068321 A1 | 6/2007 |
| WO | WO-2008/031374 A1 | 3/2008 |
| WO | WO-2008/110448 A1 | 9/2008 |
| WO | WO-2008/113684 A1 | 9/2008 |

OTHER PUBLICATIONS

Office Action Japanese Application No. 2009-553150 dated May 28, 2012.

Office Action Chinese Application No. 200980127937.2 dated Dec. 18, 2012.

Office Action EP Application No. 09 780 554.3 dated Sep. 4, 2012.

Office Action Russian Application No. 2011103037/11 dated Mar. 20, 2012.

Non-Final Office Action U.S. Appl. No. 13/006,136 dated Sep. 10, 2012.

Machine Translation of WO 01/128819 A1 to Sinnhuber et al.

* cited by examiner

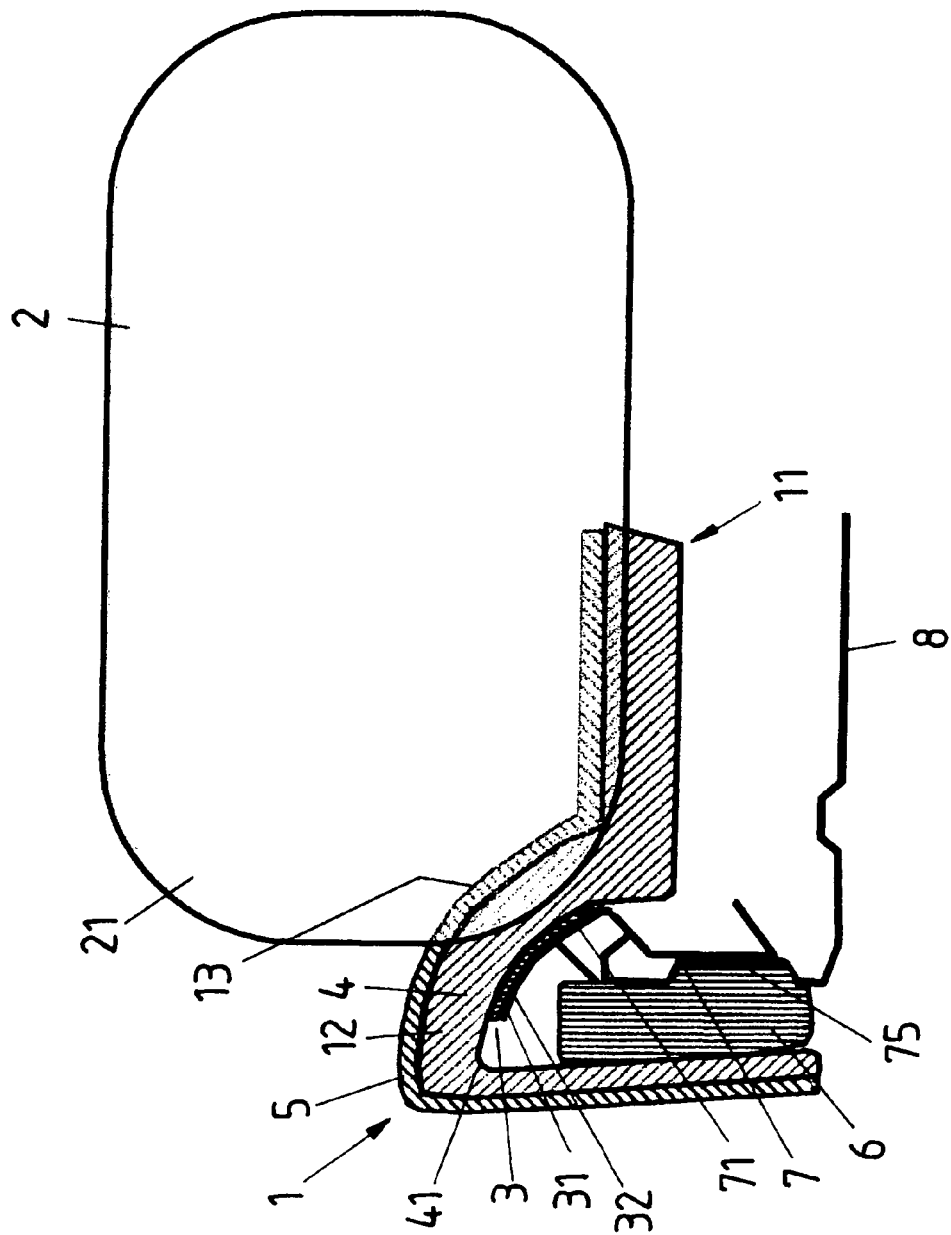

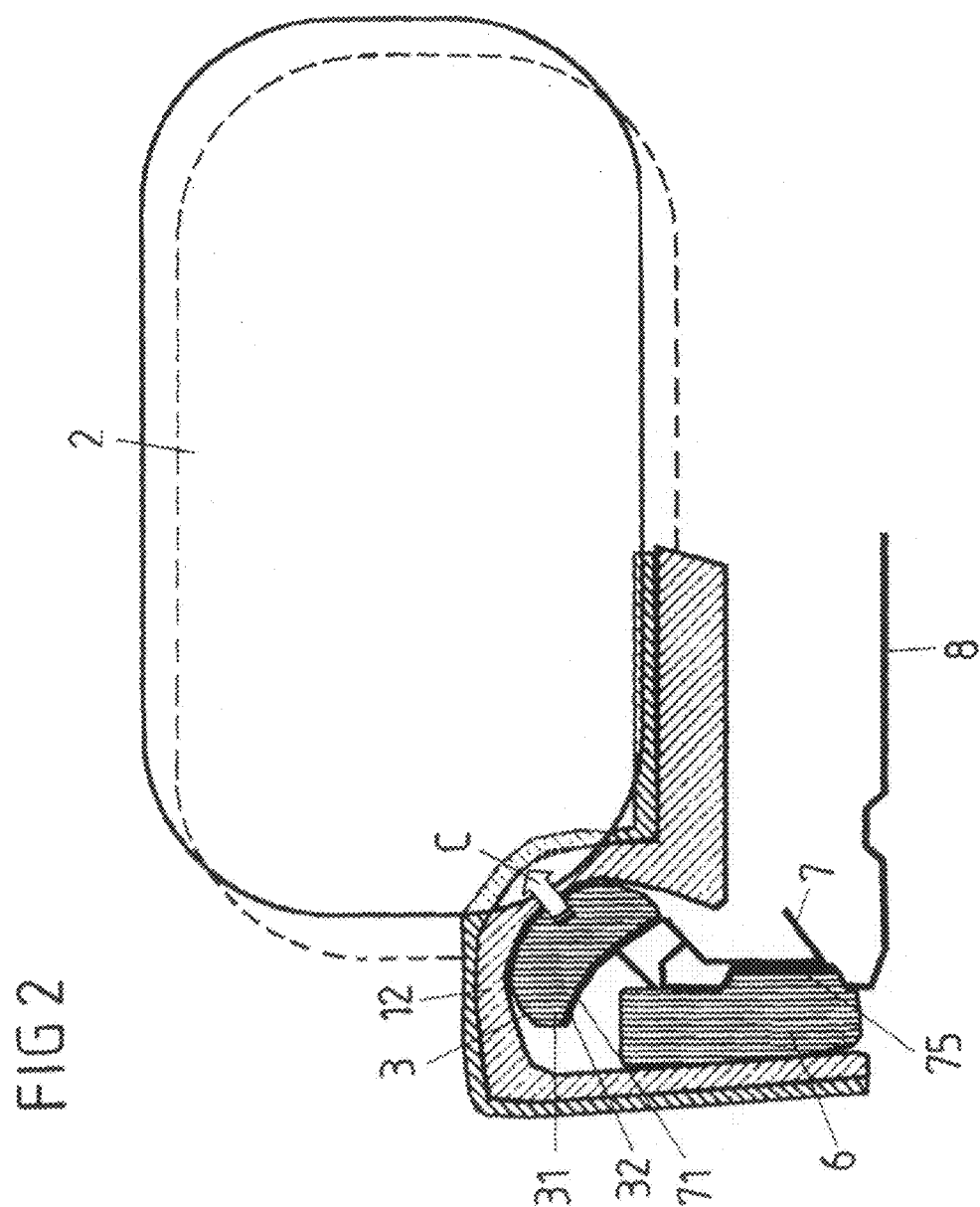

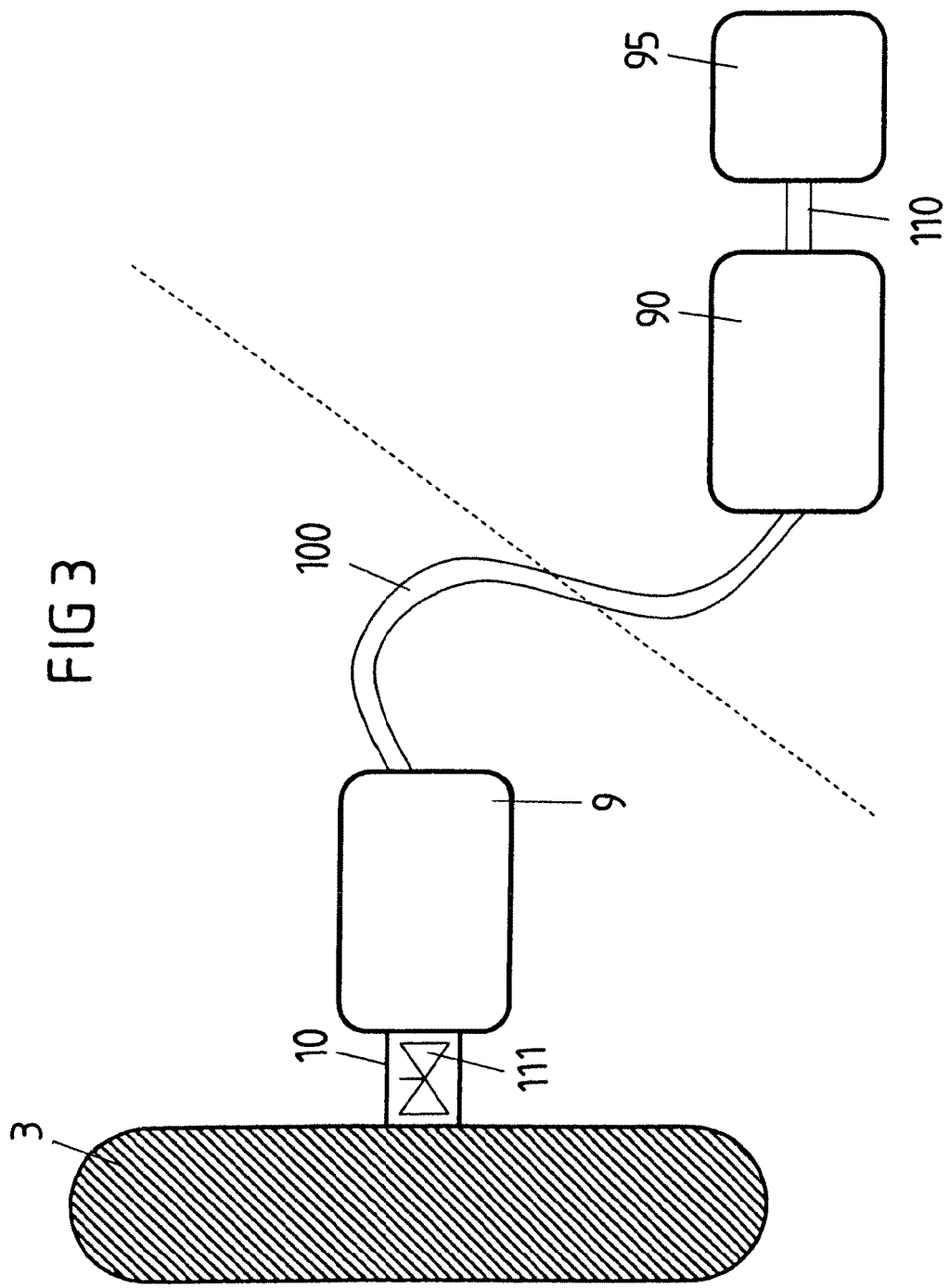

MOTOR VEHICLE SEAT ARRANGEMENT AND METHOD FOR PROTECTING A VEHICLE OCCUPANT

CROSS-REFERENCE TO RELATED PATENT APPLICATIONS

This application is a Continuation of International Patent Application No. PCT/EP2008/053027, filed Mar. 13, 2008, which was published in German on Sep. 18, 2008, as WO 2008/110610 A1. The foregoing International Application is incorporated herein by reference in its entirety.

BACKGROUND

The invention relates to a vehicle seat arrangement for a motor vehicle as well as a method for protecting a vehicle occupant.

It is known to integrate an airbag module into a vehicle seat of a motor vehicle, which upon a collision of the vehicle deploys an airbag, which shall damp the impact of the vehicle occupant onto vehicle structures. Particularly in case of a side impact the distance between the vehicle occupant and the impact location is short however, so that frequently no satisfying protection effect can be achieved.

SUMMARY

The problem that is to be solved by the invention consists in stating a vehicle seat arrangement for a vehicle as well as method for protecting a vehicle occupant by means of which an improved protection of the vehicle occupant in case of a collision of the vehicle can be achieved.

According to an exemplary embodiment of the invention a vehicle seat arrangement for a motor vehicle is provided, comprising
a vehicle seat;
at least one inflatable element arranged on the vehicle seat;
means for inflating the inflatable element, which
inflate the inflatable element depending on a control signal signaling a collision of the motor vehicle or an impending collision of the motor vehicle with an object, wherein
the inflatable element is designed and arranged such that it exerts a momentum on a vehicle occupant occupying the vehicle seat while it is inflated in answer to the control signal, which momentum moves the vehicle occupant away from a collision section of the vehicle that will collide with the object.

The exemplary embodiment of the invention allows for an inflation of the inflatable element and therewith a moving of the vehicle occupant away from the collision location particularly in answer to a pre-crash signal, i.e. before the vehicle actually collides with the object. The vehicle occupant is moved out of its seating position away from the collision section of the vehicle (collision location) by means of the inflating inflatable element, whereby an additional distance between the vehicle occupant and the collision location is achieved. This additional distance provides for an additional absorption path, whereby the consequences of the collision for the vehicle occupant are mitigated. Particularly, in case the additional distance is used by an airbag, which upon the actual incidence of the collision deploys into the generated distance and thus comprises an additional effective thickness increasing the protective effect of the airbag. In addition, by means of moving away the vehicle occupant the relative velocity between him and the vehicle structure intruding towards the vehicle inner space due to the collision can be reduced.

It is mentioned that of course also several inflatable elements can be present in the vehicle seat. Upon the incidence of an accident situation the most suitable inflatable element or several suitable elements are inflated. A suitable inflatable element is an element which is arranged such with respect to the vehicle occupant that it is able to move the vehicle occupant away from the crash location as efficient as possible, i.e. as fast and far as possible. Due to the momentum of the inflating inflatable element the occupant is moved relative to the vehicle (and relative to partial sections of the vehicle seat), the vehicle seat itself however is not moved.

Determining a suitable element can particularly be conducted by a pre-crash system. However, inflation of the inflatable element (or of the plurality of the inflatable elements) must not necessarily take place in the framework of a pre-crash measure, but can also be conducted after the collision of the vehicle has already started, for instance in order to support other protection mechanisms (e.g. side airbags) of the vehicle.

In an exemplary variant of the invention provision is made for that substantially only a body section of the vehicle occupant is moved by the momentum exerted by the inflatable element on the vehicle occupant, i.e. not his whole body. For instance, only the upper part of the body of the vehicle occupant or only a partial region of the upper part of the body (for instance the thorax region) of the vehicle occupant can be moved. For instance, the vehicle occupant substantially remains seated on the seating area of the vehicle seat, while the upper part of the body or a part of the upper part of the body is moved away from the crash location, wherein the upper part of the body performs a "tilting movement" away from the crash location, for instance.

For transferring the momentum from the inflatable element to the vehicle occupant, the inflatable element, while it is inflated, can change the shape of the vehicle seat for instance, wherein due to the change of the shape of the seat (or of partial regions of the seat) the momentum is exerted on the vehicle occupant.

Exemplary, the inflatable element can move the vehicle occupant towards the center of the vehicle in case the collision section of the vehicle (i.e. the section of the vehicle which is going to collide with the object or is already colliding) contains the longitudinal side of the vehicle being nearest to the vehicle seat ("near-side side impact"). Contrary, the inflatable element can move the vehicle occupant towards the vehicle longitudinal side being nearest to the vehicle seat in case the collision section contains the vehicle longitudinal side which faces the vehicle longitudinal side being nearest to the vehicle seat ("far-side side impact").

Generally, the inflatable element or the plurality of inflatable elements can bring the vehicle occupant in a crash position that is favorable for the vehicle occupant. Thereby, the vehicle occupant can be moved e.g. from an unusual seating position (OOP situation) into a seating position being normal with respect to the vehicle seat; i.e. the vehicle occupant is moved back from an OOP seating posture into a "normal" seating position and is moved away from the collision section of the vehicle.

In an exemplary modification of the vehicle seat arrangement according to the invention, the vehicle seat comprises a middle part as well as at least one side wall laterally limiting the middle part. The inflatable element is arranged in the side wall such that by means of inflating the inflatable element the shape of the side wall changes, whereby the momentum is exerted on the vehicle occupant. Particularly, of course also several inflatable elements can be present in one or in two opposing side walls of the vehicle seat.

The side wall or the side walls can also limit a middle part of the seat rest, for instance, so that the inflatable element is arranged in the region of the upper part of the body of the vehicle occupant. However, additionally or alternatively, provision can be made for that the middle part of the seating area of the vehicle seat is limited by side walls and comprises at least one inflatable element, so as to be able to also move away the lower body region of the vehicle occupant from the collision section of the vehicle.

The means for inflating the inflatable element can also be integrated into the vehicle seat, for instance. Exemplary, the means for inflation are designed and arranged with respect to the inflatable element in a way to quickly inflate the inflatable element upon an impending collision such that moving the vehicle occupant away already starts before the actual collision (i.e. contact of the vehicle to the object). For instance, the moving-away can take place approximately 25 ms to 500 ms before the beginning of the actual collision.

Additionally, the means for inflation can be designed and provided for inflating the inflatable element also independent of the control signal indicating a collision, so as to adapt the vehicle seat to the contours of the vehicle occupant, i.e., to realize besides the protective function also an additional comfort function.

The means for inflating the inflatable element may additionally comprise at least one pressure reservoir which is designed and provided for delivering gas in an impulse-like manner to the inflatable element. For instance, the pressure reservoir can be integrated into the vehicle seat or can be arranged outside the vehicle seat and can be realized by a reception filled with gas under pressure (or for instance also with liquid gas).

In another exemplary modification of the invention provision is made for that at least one pressure reservoir integrated into the vehicle seat for inflating the inflatable element (or the inflatable elements) and at least one pressure storage arranged for example outside the vehicle seat for filling the pressure reservoir is present. In turn, the pressure storage arranged outside the vehicle seat (central in the vehicle) can for example be connected to a pressure generating device, for instance in the form of a compressor, and can be filled by the latter with pressurized air or so. In another variant a local pressure reservoir (i.e. integrated into the seat) is directly filled by means of a pressure generating device. Furthermore, it is also possible that only one pressure generating device is provided outside the vehicle seat to which the inflatable element is connected via a connection conduit, i.e. it is filled directly, without having an intermediary pressure reservoir in the vehicle seat.

The exemplary variant of the invention according to which a (local or central) pressure reservoir for filling the inflatable element is provided, is particularly suited for filling the inflatable element repeatedly. As an alternative to a pressure reservoir, for example a gas generator based on a pyrotechnical generation of gas can be used for inflating the inflatable element. Of course also other kinds of gas generators can be employed, e.g. hybrid- or cold gas generators. However, generally, by means of a gas generator the inflatable element can be filled only once.

A flow channel having a cross-section as large as possible is provided between the pressure reservoir for inflating the inflatable element and the inflatable element, so as to allow for a gas flow to the inflatable element in an activation case being as large as possible and therewith for a filling of the inflatable element that is as fast as possible. Additionally, a fast switching valve can be arranged between the pressure storage and the inflatable element which is opened in answer to the control signal and frees the flow channel.

Exemplary, a first flow channel can exist between the local pressure reservoir being integrated into the vehicle seat and the inflatable element and a second flow channel can exist between the central pressure storage being arranged outside the vehicle seat and the local pressure reservoir. In a variant of the invention, the flow cross-section of the second flow channel is chosen to be smaller than the flow cross-section of the first flow channel. For instance, a structure can be present which reduces the flow cross-section of the second flow channel in sections, e.g. a gate between the central pressure storage and the pressure reservoir being arranged locally in the vehicle seat. Particularly, an overload of a compressor used for filling the pressure reservoir can be avoided hereby. Instead of a central pressure storage, the second flow channel can also connect a pressure generating device (e.g. compressor) to the local pressure reservoirs.

In another exemplary modification of the invention means (e.g. in the form of a control valve) are provided which interact with the means for inflating the inflatable element and by means of which a filling velocity with which the inflatable element is inflated is adjustable. In particular, the adjusting means can allow for a continuous adjustment. It is however also possible that by means of the adjusting means a first and a second filling velocity is adjustable, wherein the amount of the first filling velocity is larger than the amount of the second filling velocity (two-stage adjustment possibility). This allows for the fast filling of the inflatable element in an accident situation in case the larger filling velocity has been chosen and in case of choosing the smaller filling velocity a filling of the inflatable element for comfort purposes.

Instead of a two-stage adjusting possibility of course a multi-stage adjusting possibility can generally be present. The adjusting means comprise e.g. a control valve whose cross-section is adjustable. In another example at least two valves having different cross-sections are provided, wherein by means of two valves already three different filling velocities can be realized (filling via one of the two valves or via both of the valves).

Exemplary, an adaptation of the filling velocity (and/or the filling pressure) depending on the expected severity of the collision can take place via the adjusting means. For instance, data of a pre-crash sensor system (e.g. a radar device) can be employed for estimating the expected crash severity.

In a further exemplary embodiment of the invention the inflatable Element is designed to be reversible, i.e., after an inflation and emptying it takes its state (its shape and position) occupied before the inflation. For this purpose the inflatable element can be formed out of a material that comprises a sufficient inherent elasticity, so that the inflatable element returns to its original shape after an inflation and emptying. Examples for such a material are rubber or siliconized (i.e. coated with silicone) airbag fabric.

In addition, the inflatable element can comprise a chamber that is designed to be substantially gas-tight. For generating such a gas-tight chamber conventional airbag fabric can be considered, like e.g. woven nylon which is sealed by means of siliconization or so. At this point it is noted that the inflatable element must not only comprise a single chamber but may comprise several inflatable chambers, which can be inflated with different pressures if necessary (and must not all be designed gas-tight). Basically, also an inflatable element having a single chamber can be used which is not designed to be gas-tight. For instance, an usual airbag that is used for airbag restraint systems can be employed, wherein leakages in the region of seams are accepted.

As already explained above, the vehicle seat arrangement may comprise several inflatable elements integrated into the vehicle seat. In particular, two (or even more than two) inflatable elements can be present, which are arranged such (e.g. that they butt against each other) that they are able to exert the same momentum (or at least a momentum having the same direction) on the vehicle occupant, respectively. The momenta exerted by the inflatable elements on the vehicle occupant upon inflation are approximately added. For instance, the inflatable elements can be formed out of a plane cut (e.g. out of two material layers connected to each other at their circumferences) and can be arranged such that one inflatable element substantially completely overlaps the other one. Hence, in this variant the inflatable elements are arranged such that they are stacked on top of each other.

Moreover, exemplary, the inflation of the inflatable element can take place adaptively, i.e., it can be adapted to body parameter of the vehicle occupant. For this purpose, sensors can be integrated e.g. into the vehicle seat, which sensors determine for example the body weight or the width of the vehicle occupant.

Furthermore, the invention implies besides the use of the inflatable element as a protective system—or in addition as a comfort element for adapting the shape of the vehicle seat to the body contours of the vehicle occupant—the inflation of the inflatable element for generating a bodily perceivable warning to the vehicle occupant. In case of an impending crash or generally a dangerous situation, the inflatable element can be inflated such that the vehicle occupant is (slightly) pushed, so as to call his attention to the dangerous situation.

In another exemplary variant of the invention the inflatable element is at least covered in sections by a covering, wherein the covering is formed for example by a seat cover of the vehicle seat. More over, the vehicle seat arrangement can comprise means (for instance a spring or an elastic band) for exerting a restoring force on the covering in the region of the inflatable element, so that the covering has the tendency after an inflation and a re-emptying of the inflatable element to return to its state occupied before the inflation of the inflatable element. The filling and emptying of the inflatable element can therefore be conducted reversibly, e.g. in case the inflatable element is activated for purposes of comfort or in case the inflatable element is inflated due to a pre-crash signal, the crash has however not occurred yet.

Exemplary, the covering can be designed to be elastic in the region of the inflatable element so that it expands upon inflation of the inflatable element and has the tendency to return into its original state after a re-emptying of the inflatable element. For instance, the covering is formed out of an elastic textile fabric being expandable in a way that the covering is not damaged upon inflation of the inflatable element.

In an exemplary modification, the vehicle seat comprises a seat upholstery which is at least partially covered by a seat cover, and the inflatable element is at least in sections arranged in between the seat upholstery and the seat cover, i.e. a section of the seat cover forms the covering.

Of course, also other installation positions can be considered for the inflatable element, e.g. on an inner side (facing away from the seat cover) of the upholstery. The inflatable element can be arranged such that it does not leave the seat cover in an inflated state.

In a further exemplary embodiment the inflatable element extends at least in sections in a casing, which in an uninflated state of the inflatable element follows the contours of the vehicle seat at least along a section, e.g. butts against an outer side of the vehicle seat. Upon inflation of the inflatable element, the section moves away from the vehicle seat.

In an exemplary variant the casing comprises means via which a section of the casing is releasably connected to the vehicle seat before the inflation in a way that it is released upon inflation of the inflatable element. The means comprise e.g. structures for a hook-and-loop or a pushbutton fastener. More over, means can be present which bring back the casing into its initial position after the deployment and re-emptying of the inflatable element, e.g. in the form of an elastic element.

It is pointed out that the control signal can not only be generated by a pre-crash sensor system, but, as a control signal, e.g. also a signal of an ESC (Electronic Stability Control)-unit ("ESP unit") can be used. Alternatively, the control signal can be generated by a crash sensor system that determines a crash that has actually occurred, so that the inflatable element is not activated before, but upon the incidence of the crash.

A pre-crash control signal is generated e.g. 0-1000 ms before the expected crash. Particularly, the inflatable element or several inflatable elements together may achieve a movement of the vehicle occupant having a velocity of 0.1-1.5 m/s. The inflatable element can be inflated e.g. with an internal pressure between 5 and 500 kPa. It shall be understood that these values are only exemplary and that the invention of course implies other variants, e.g. lower or higher internal pressures of the inflatable element.

Furthermore, in another exemplary aspect an exemplary embodiment of the invention relates to a vehicle seat arrangement having an inflatable element as well as means for damping an impact of a vehicle occupant occupying the vehicle seat onto that inflatable element being in an inflated state. The means allow for an absorption of impact energy in order to reduce the injury risk for the vehicle occupant during an impact onto the filled inflatable element. Particularly, such an inflatable element can be present additionally or alternatively to a side airbag being arranged between the vehicle seat and a vehicle longitudinal side.

In an exemplary variant the means comprise at least one exhaust port (vent hole) via which gas can flow out of the inflatable element. Particularly, the exhaust port can be realized in the form of a (e.g. switchable) valve which e.g. opens upon reaching a pre-definable internal pressure in the inflatable element or opens dependent on time and can stay open or can close after a certain amount of time, in order to maintain a minimal internal pressure in the inflatable element.

Moreover an exemplary embodiment the invention relates to a method for protecting a vehicle occupant comprising the steps of:

providing a motor vehicle seat having at least one inflatable element arranged on the vehicle seat;

generating a control signal signalling an impending collision of the motor vehicle with an object;

inflating the inflatable element depending on the control signal, wherein the inflatable element exerts a momentum on a vehicle occupant occupying the vehicle seat while it is inflated in answer to the control signal, which momentum moves the vehicle occupant away from a collision section of the vehicle which is going to collide with the object.

Exemplary, the inflatable element can be inflated only partially due to the control signal, which may be favorable in certain crash situations. In this variant, the inflatable element is e.g. not filled in a way that it pushes away the vehicle occupant as far as possible, but in a way that it brings him (e.g. out of an out-of-position) into a central position with respect to the vehicle seat. Particularly, this can be advantageous in case of a sideslip of the vehicle, since here, the collision side is hard to determine. As a control signal e.g. a signal of a ESC unit can be used.

In an exemplary modification of the method
   a first control signal is generated at a first point in time and a second control signal is generated at a second point in time, wherein
   the inflatable element is filled in response to the first control signal using a first filling velocity and in response to the second control signal is filled using a second filling velocity which is different from the first filling velocity.

Exemplary, the second filling velocity is larger than the first one, i.e., the inflatable element is at first filled with a relatively low velocity (or volume flow) and in a later phase with a higher velocity. This can be reasonable, since the prediction safety of pre-crash units increase the closer in time the expected crash gets. Thus, in a relatively early phase of the detection of an expected crash, e.g. 300 ms before the crash, the inflatable element can already be filled with gas slowly in a way that the driver is not irritated. For instance, a dangerous situation in an area that is good to keep in view (e.g. by radar) can be registered long before a possible crash occurs which can be used for a pre-filling of the inflatable element.

At a later point in time (e.g. 100 ms or so before the calculated point in time of the crash) the filling velocity can be increased (e.g. to a maximal value) in case the incidence of a crash is to be regarded as possible and/or precise information with respect to the expected crash severity exist. The different filling velocities can be realized as already mentioned above e.g. via a continuously controllable valve or a plurality of valves of different cross-section.

It may also become apparent at the second point in time that the crash will not occur or with less severity, so that the filling is interrupted or continued with a lower velocity.

In another exemplary embodiment of the method the vehicle seat comprises two opposing inflatable elements, wherein only the inflatable element is inflated that faces the expected collision location. In case the inflatable element being further away from the collision location is in an inflated state it can be emptied while the other element is inflated. Thus pushing away the vehicle occupant is not hampered by an inflated element on the side facing away from the collision location.

In an exemplary variant the vehicle seat comprises a plurality of inflatable elements acting in the same direction, wherein due to the control signal all of these inflatable elements are inflated (protective function). Alternatively, only one or only a few of these inflatable elements are inflated (e.g. in case of employing the inflatable elements for comfort purposes). The inflatable elements can also be arranged such that they extend on top of each other between a seat upholstery and a vehicle occupant occupying the seat.

BRIEF DESCRIPTION OF THE DRAWINGS

In the following the invention is explained in more detail on the basis of embodiments with reference to the Figures.

FIG. 1a shows a schematic cross-section of a backrest of a first embodiment of a vehicle seat arrangement according to the invention.

FIG. 2 shows the vehicle seat arrangement of the FIGS. 1a to 1c after inflation of an inflatable element.

FIG. 3 shows an arrangement for inflating an inflatable element.

DETAILED DESCRIPTION

Figure 1B:
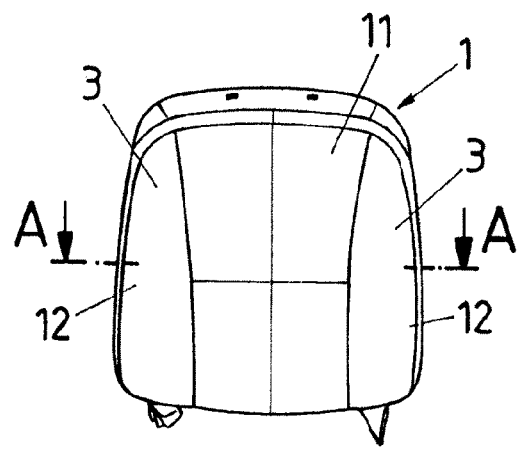
FIG. 1b shows a front view of the backrest of the first embodiment of a vehicle seat arrangement according to the invention.
Figure 1C:
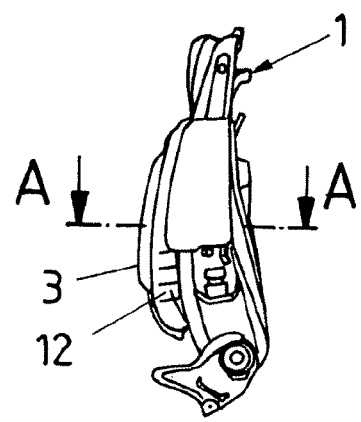
FIG. 1c shows a side view of the backrest of the first embodiment of a vehicle seat arrangement according to the invention.

FIG. 1a shows a schematic cross-section of a backrest 1 of a vehicle seat according to a variant of the vehicle seat arrangement according to the invention. FIGS. 1b and 1c show a front or a side view of the backrest 1, respectively.

The vehicle seat (not shown completely) is occupied by an vehicle occupant 2 (not shown in FIGS. 1b and 1c) which rests with his back on the backrest 1. The backrest 1 comprises a middle part 11 laterally limited by side walls 12, wherein in FIG. 1a only a half or so of the backrest 1 and thus only one side wall is shown. From FIG. 1b one can infer that the middle part 11 is limited on both sides by side walls 12. The side walls 12 run along a side 21 of the vehicle occupant 2, so that he is laterally supported by the side walls 12.

An inflatable element 3 is integrated into the side walls 12, respectively. The inflatable elements 3 comprise an inflatable chamber 31, respectively, which can be filled with a gas (e.g. pressurized air). By inflating one of the inflatable elements 3 the shape of the side wall 12 can be changed and a momentum can be exerted on the vehicle occupant 2. Inflation of the inflatable elements is conducted depending on a control signal e.g. of a pre-crash system signaling an impending collision of the vehicle. The inflatable element 3 is designed such and arranged with respect to the vehicle occupant 2 such that his upper part of the body is moved away from the original position by the momentum which is exerted on him by the inflatable element while it is inflated in answer to the control signal.

Here, the inflatable element of the two inflatable elements 3 is inflated which exerts a momentum on the vehicle occupant which points away from a collision section of the vehicle that is going to collide with an object, i.e. that moves the vehicle occupant at least partially away (with the upper part of the body) from the collision section. In this way, e.g. in case of a side crash, the inflatable element of the side wall that faces the vehicle longitudinal side that is expected to be affected by the crash can be activated, so as to move the vehicle occupant away from the affected side of the vehicle.

Moving the vehicle occupant 2 away is shown in FIG. 2, according thereto the vehicle occupant 2 is moved out of its original position (dashed line) into a new position (solid line) along a direction C. In this example, the upper part of the body of the vehicle occupant is moved away (tilted) from the crash location, while the vehicle occupant substantially maintains his original seating position with his lower part of the body. It can also be provided however, that at least one additional inflatable element is arranged in the seating area of the vehicle seat, so as to move the vehicle occupant also with his lower region (pelvis region), so that the vehicle occupant is moved altogether.

The inflatable element 3 is arranged on an inner side 41 of a seat upholstery 4 (which is covered towards the vehicle occupant by a seat cover 5) so that it also extends after the inflation inside the side wall 12, i.e. inside the vehicle seat. By means of inflating the inflatable element 3 the shape of the side wall (particularly of the upholstery 4) is changed, whereby the momentum is exerted on the vehicle occupant 2.

Due to moving away the occupant from the collision location, an additional absorption path is generated between the collision path and the vehicle occupant, which mitigates the effect of the crash on the vehicle occupant. Furthermore, the additionally generated distance from an airbag additionally deploying during the collision (e.g. side airbag) can be used, so that an additional airbag effective thickness is generated. As shown in FIGS. 1a and 2, besides the inflatable element 3 a side airbag module 6 is arranged in the side wall 12 comprising an airbag which is inflated upon incidence of a collision and extends between the vehicle occupant and a vehicle longitudinal side. The side airbag module 6 is a usual airbag module that besides the airbag also comprises a gas generator for inflating the airbag.

For inflation, the inflatable element 3 is connected to means for inflation (not shown), which can be integrated into the vehicle seat, i.e. for instance into the backrest 1 or can also be arranged outside the vehicle seat.

Moreover, the side walls 12 respectively comprise supporting structures 7 supporting the inflatable element 3. The supporting structures are respectively connected with a section 75 to a frame 8 of the seat rest 1. Furthermore, the supporting structures 7 form a section 71, respectively, which extends along a side 32 of the inflatable element 3 facing away from the vehicle occupant 2 (or from a leaning side 13 of the backrest 1). By means of the supporting section 71 it is achieved that the inflatable element 3 is enlarged towards the vehicle occupant 2 during inflation and not away from him, so that a momentum is exerted on the vehicle occupant that is as large as possible and that a distance as large as possible exists between the vehicle occupant and the collision location after inflation.

It is noted, that of course several inflatable elements can be arranged in a side wall. For instance, several inflatable elements having different orientations can be arranged, so that the inflatable elements would extend in an inflated state in different directions, whereby, depending on the selection of the element that shall be inflated, it is possible to move the vehicle occupant in different directions. The selection which of the inflatable elements or which group of elements shall be inflated particularly occurs depending on the position of the collision location. Additionally elements can be activated that bring the vehicle occupant out of an OOP towards a "normal" seating position.

Further, it is noted that a vehicle seat of a vehicle seat arrangement according to the invention must not necessarily be designed symmetrically, but e.g. may comprise only in one side wall an inflatable element or means for inflation.

FIG. 3 schematically shows a device for inflating (filling) an inflatable element 3 for a vehicle seat arrangement (not shown) according to the invention. The device comprises means for inflating the inflatable element 3, which comprise a local pressure reservoir 9 that is to be integrated into a vehicle seat of the vehicle seat arrangement. The pressure reservoir 9 is a container designed substantially gas-tight that can be filled with a gas, particularly pressurized air, or a liquid gas and is in fluid communication with the inflatable element 3 via a flow channel 10.

The flow channel 10 comprises a large cross section and can be set free abruptly by means of fast switching valve 111 in answer to a control signal (e.g. from a pre-crash sensor system), so that gas can be discharged from the pressure reservoir 9 in an impulse-like manner into the inflatable element and thus the latter can be filled abruptly. Particularly, the flow channel 10 and the valve 111 are designed such that the gas flow flowing from the pressure reservoir 9 into the inflatable element 3 is large enough to inflate the inflatable element before a collision detected by a pre-crash system actually takes place.

For filling the local pressure storage 9, a central pressure storage 90 is provided that is to be arranged outside the vehicle seat, which pressure storage 90 is in fluid communication via a further flow channel 100 with the local pressure storage 9. The central pressure storage 90 is fed by a compressor 95 (pressure generating device) that is to be arranged also outside the vehicle seat, which generates pressurized air and channels it via a flow channel 110 into the central pressure storage 90. The central pressure storage 90 can also be designed for instance, to supply several local pressure storages that can be e.g. arranged also in different vehicle seats. The division into a local (vehicle seat) and a central region is indicated in FIG. 3 by a dashed line.

Figure 4:
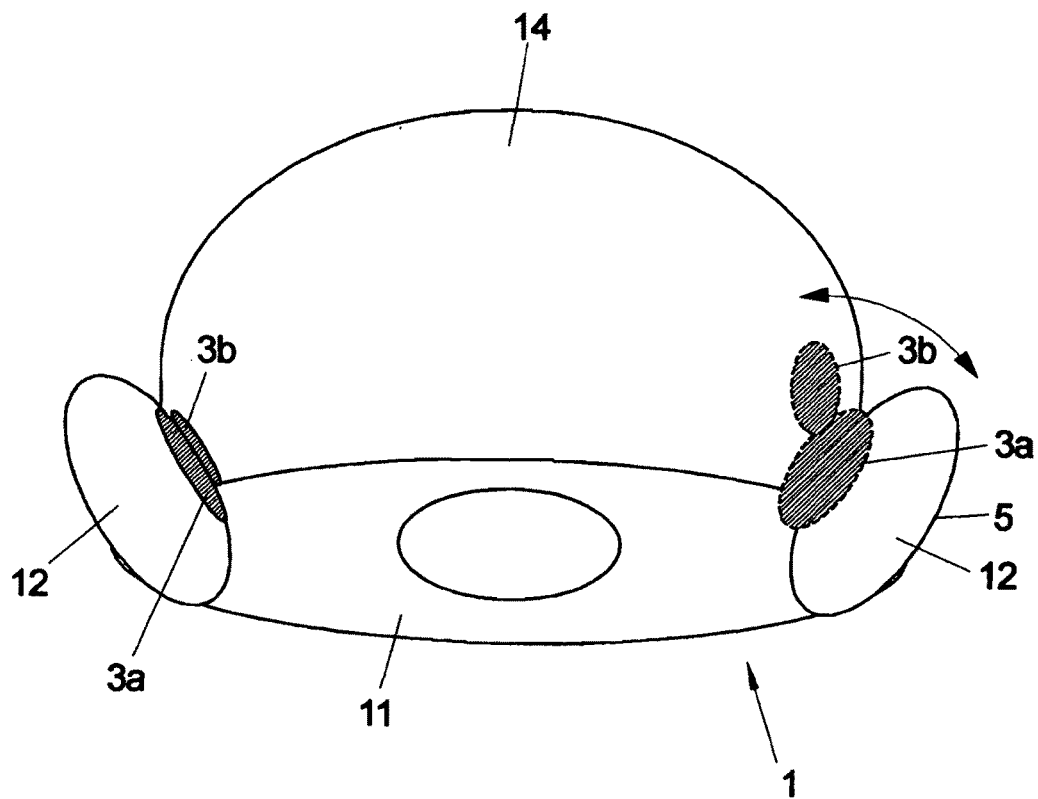
FIG. 4 shows a vehicle seat arrangement according to a second embodiment of the invention in a schematic plan view.

The schematic illustration of FIG. 4 shows a vehicle seat from above having a seating area 14 as well as a backrest 1 having a middle part 11, which middle part 11 is limited by two opposing side walls 12.

On each of the two side walls 12 two inflatable elements 3a, 3b are arranged, respectively, via which a momentum can be exerted on a vehicle occupant (not shown) occupying the seat. The inflatable elements 3a, 3b are arranged on a side of the side walls 3 that faces a vehicle occupant being on the seat, so that they extend on top of each other between the side wall 3 and the vehicle occupant. The inflatable elements of the right side wall are inflated, while the inflatable elements of the left side wall are in a non-inflated state.

The inflatable elements can also be arranged below a cover 5 of the vehicle seat, i.e. they are located between the seat cover 4 and a seat core, e.g. an upholstery. Particularly both of the inflatable elements 3a, 3b can be designed and arranged such that they also extend below the seat cover 5 in the inflated state, i.e. are covered by the latter.

Figure 5:
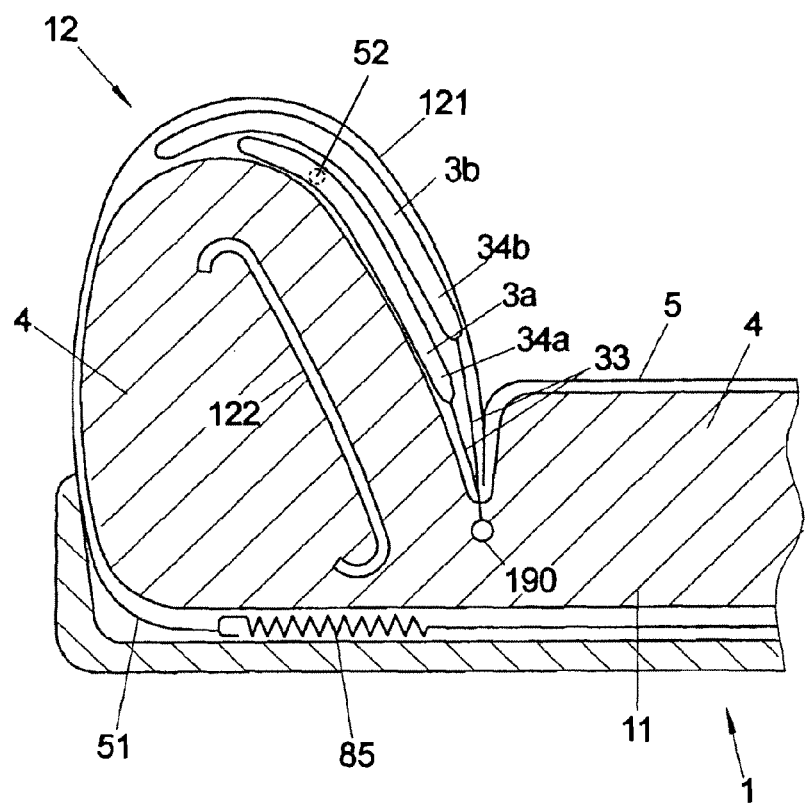
FIG. 5 shows a detail of a vehicle seat arrangement according to a third embodiment of the invention.

FIG. 5 relates to a further variant of the vehicle seat arrangement according to the invention. As in the preceding FIGS., the backrest 1 comprises a middle part 11 that is laterally limited by side walls 12 of which only one is shown in FIG. 5. Furthermore, the backrest 1 comprises a material core in the form of an upholstery 4 that continuously forms a core of the middle part 11 as well as of the side walls 12. Additionally, Inside the side wall 12 a carrier element 122 is present, so as to stabilize the side wall. The upholstery is covered by a seat cover 5.

In the side wall 12 two inflatable elements 3a, 3b are arranged between the upholstery 4 and the cover 5 so that they partially overlap each other, wherein the cover 5 forms a covering in the region of the inflatable elements 3a, 3b for the latter. The inflatable elements 3a, 3b respectively extend with a section in a region 121 of the side wall 12 which faces a vehicle occupant occupying the vehicle seat, but are however arranged offset along the upholstery 4.

The inflatable elements 3a, 3b are respectively fastened in a pivotable manner with ends 34a, 34b via bands 33 to a fastening section in the form of a pivot point 190, so that upon inflation they both move towards the vehicle occupant to be protected around the pivot point 190, i.e. approximately on a circular path. Due to the arrangement of the inflatable elements 3a, 3b being offset, the inflatable element 3b being closer to the vehicle occupant to be protected is located with a partial region—as viewed in the vehicle forward direction—before the inner inflatable element 3a and particularly exerts a momentum on the thorax region of the vehicle occupant.

Moreover, the vehicle seat comprises means for exerting a restoring force on the cover 5 in the form of a spring 85 arranged in the side wall 12. The spring 85 is connected to an end section 51 of the cover 5, so that on the one hand the spring 85 allows for an expansion of the cover 5 when the (or one of the) inflatable elements 3a, 3b deploy, so that the cover 5 is not destroyed by the deploying inflatable elements 3a, 3b. On the other hand, the spring 85 exerts a restoring force on the cover 5 (expanded by the inflatable elements 3a, 3b), so that the latter returns to its original position after a re-emptying of the inflatable elements 3a, 3b, i.e. then substantially butts against the material core 4.

Figure 6:
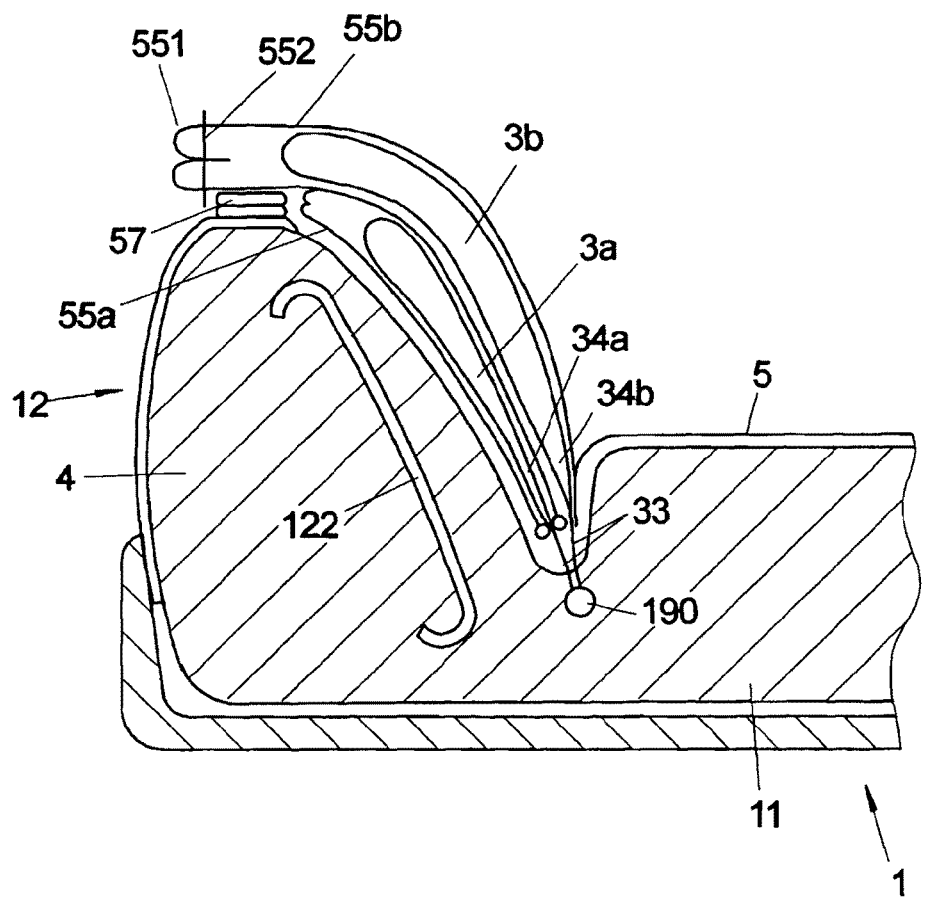
FIG. 6 shows a detail of a vehicle seat arrangement according to a fourth embodiment of the invention.

FIG. 6 relates to a further variant of the invention, wherein the design of the seat structure is similar to that of FIG. 5. Here, the inflatable elements 3a, 3b are however encompassed in separate, bag-like casings 55a, 55b, which are connected to the cover 5 or are integrally formed with the latter. An end 551 of the casing 55b of the outer inflatable element 3b that faces a vehicle occupant (not shown) occupying the seat, is releasably fastened to the side wall 12 via fastening means in the form of a magnet-connection 57 (and re-lockable). It is to be understood that other kinds of fastening means can be used, e.g. a hook-and-loop fastener. In another variant the casings 55a, 55b do not comprise means for fastening to the vehicle seat, but are designed such that they follow the shape of the vehicle seat at least in sections without being connected to the vehicle seat.

As shown in FIG. 5, the inflatable elements are pivotably fastened via their ends 34a, 34b and bands 33 to a pivot point 190. Upon inflation of the inflatable elements 3a, 3b the end 551 is detached from the outer casing 55b so that the elements 3a, 3b are moved about the pivot point 190, but in comparison to the variant of FIG. 5 can be deployed more freely. For instance, they can assume a larger volume and can extend closer to the vehicle occupant to be protected.

FIG. 5 schematically shows a means for damping an impact of a vehicle occupant occupying the vehicle seat onto an inflatable element being in an inflated state. The means may comprise at least one exhaust port 52 via which gas can flow out of one of the inflatable elements 3a, 3b. Particularly, the exhaust port 52 can be realized in the form of a (e.g. switchable) valve which e.g. opens upon reaching a pre-definable internal pressure in the inflatable element or opens dependent on time and can stay open or can close after a certain amount of time, in order to maintain a minimal internal pressure in the inflatable element.

The outer casing 55b is formed out of two partial pieces in the example of FIG. 6, which are connected at the end 551 with a seam 552. It is to be understood, that the casings 55a, 55b can also be designed in one piece. Furthermore, instead of separate casings 55a, 55b also a common casing can be provided, which jointly encloses both of the inflatable elements 3a, 3b.

Figure 7:
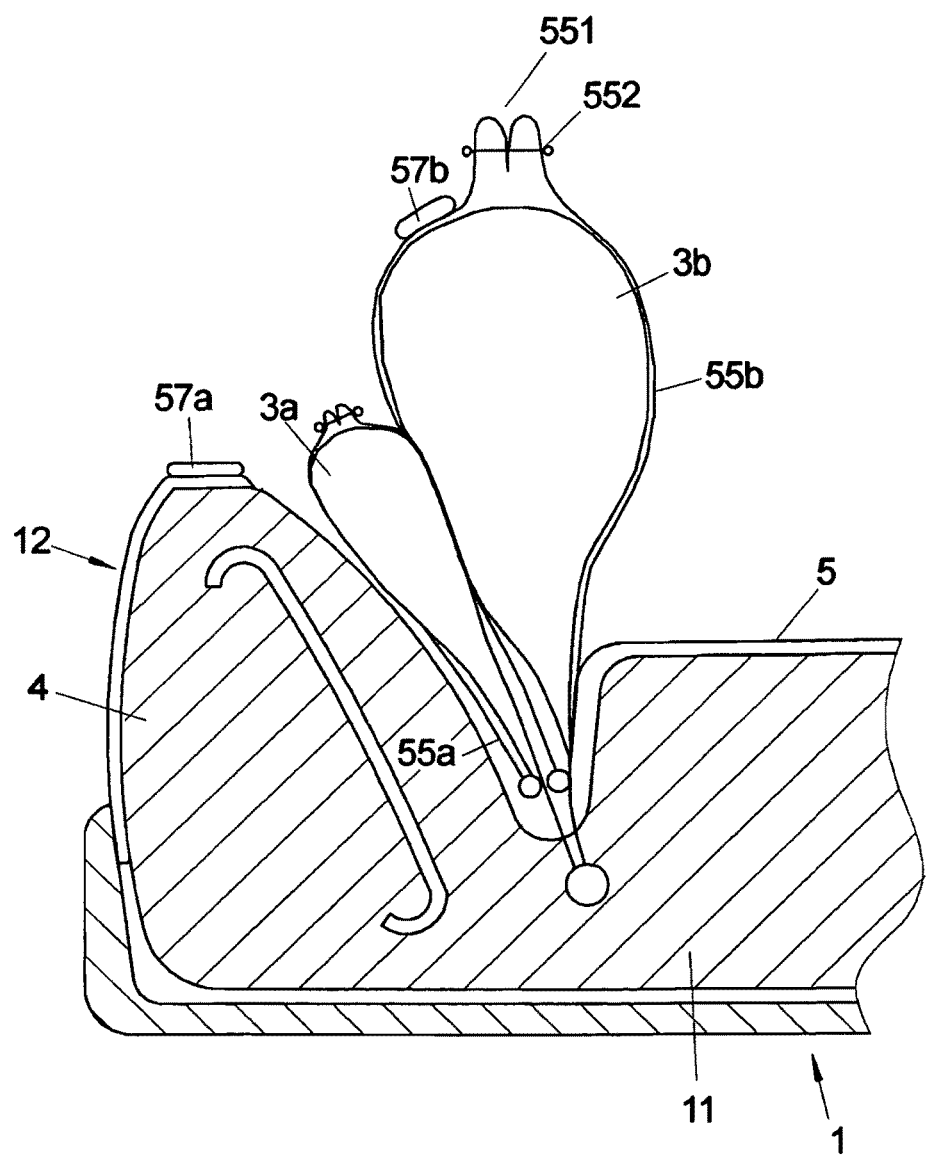
FIG. 7 shows the arrangement of FIG. 6 having inflatable elements in an inflated state.

FIG. 7 shows the arrangement of FIG. 6 after the inflation of the inflatable elements 3a, 3b. The end 551 of the outer casing 55b originally fastened to the side wall 12 has loosened, whereby the inflatable elements 3a, 3b were able to freely deploy and move towards vehicle occupant to be protected (not shown). The casings 55a, 55b can be designed such that they return to their original position occupied before the inflation of the inflatable elements 3a, 3b when the inflatable elements 3a, 3b are emptied, so that the connection 57 (having components 57a, 57b) closes again.

Figure 8:
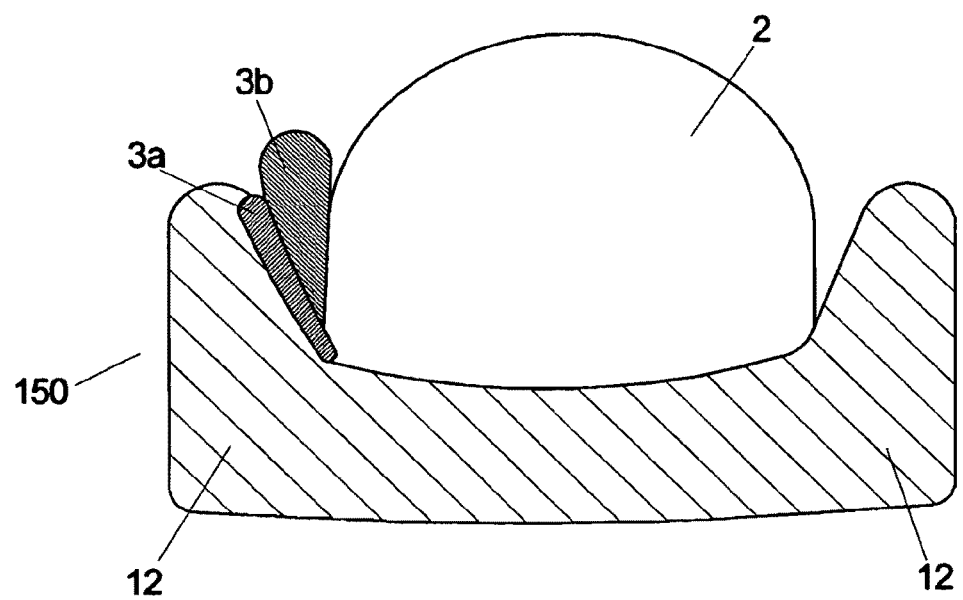
FIG. 8 shows a schematic cut through a vehicle seat according to the invention.

FIG. 8 schematically shows a cut through a vehicle seat occupied by a vehicle occupant 2. The seat comprises side walls 12 adjoining the vehicle occupant 2 on opposing sides. On one of the two side walls being closer to the vehicle longitudinal side 150, two inflatable elements 3a, 3b are arranged which are shown in an inflated state.

As shown in FIGS. 5 to 7, the inflatable elements 3a, 3b are arranged offset, wherein they partially overlap, the inflatable element 3b being arranged closer to the vehicle occupant 2 however lies in with a partial region in front of the (inner) inflatable element 3a.

The priority applications, German Patent Application No. 10 2007 013 106.4, filed Mar. 15, 2007, including the specification, drawings, claims and abstract, and German Patent Application No. 10 2007 057 016.5, filed Nov. 23, 2007, including the specification, drawings, claims and abstract, are incorporated herein by reference in their entireties.

What is claimed is:

1. A motor vehicle seat arrangement for a motor vehicle, comprising:
   a vehicle seat have a seating area and a backrest, the backrest having a given side wall;
   two inflatable elements arranged on the vehicle seat and which elements can be inflated in order to protect a vehicle occupant occupying the vehicle seat; and
   means for inflating the two inflatable elements, the means for inflating being configured to inflate the two inflatable elements depending on a control signal that signals a collision of the motor vehicle or an impending collision of the motor vehicle with an object,
   wherein the vehicle seat arrangement is to be arranged in the vehicle and the two inflatable elements are designed and arranged in a way that the two inflatable elements exert a momentum on an upper part of the body of the vehicle occupant while the two inflatable elements are inflated in answer to the control signal, so that only the upper part of the body is moved such that the thorax region of the upper part of the body of the vehicle occupant performs a tilting movement away from the collision section of the vehicle,
   wherein the two inflatable elements are arranged in such a way that the two inflatable elements at least partially overlap one another,
   wherein the two overlapping inflatable elements are fastened in a pivotable manner to a pivot point via bands so that upon inflation the two inflatable elements perform a rotation movement towards the vehicle occupant around the pivot point, and
   wherein the pivot point to which the bands are connected thereto is located within a material core of an upholstery of the vehicle seat.

2. The motor vehicle seat arrangement according to claim 1, wherein the two inflatable elements are configured to exert the momentum such that the vehicle occupant is moved towards a longitudinal side of the motor vehicle nearest to the vehicle seat in case the collision section contains a longitudinal side of the motor vehicle facing the longitudinal side of the motor vehicle nearest to the vehicle seat.

3. The motor vehicle seat arrangement according to claim 1, wherein the shape of the vehicle seat changes due to the inflation of the two inflatable elements and thereby the momentum is exerted on the vehicle occupant.

4. The motor vehicle seat arrangement according to claim 1, wherein the means for inflating the two inflatable elements are designed and arranged to quickly inflate the two inflatable elements upon the impending collision in a way that a moving-away of the vehicle occupant starts before incidence of the collision.

5. The motor vehicle seat arrangement according to claim 1, wherein the means for inflating the two inflatable elements comprise:
- at least one pressure reservoir which is designed and provided to deliver gas to the two inflatable elements in an impulse-like manner, and
- at least one pressure storage which is integrated into the vehicle seat or is arranged outside the vehicle seat for filling the pressure reservoir.

6. The motor vehicle seat arrangement according to claim 5, further comprising a flow channel running between the pressure reservoir and the two inflatable elements, which flow channel can be set free abruptly in answer to the control signal, so that the two inflatable elements can be inflated abruptly.

7. The motor vehicle seat arrangement according to claim 5, wherein the pressure reservoir is a container filled with gas or liquid gas.

8. The motor vehicle seat arrangement according to claim 1, wherein the two inflatable elements are designed to again resume, after the inflation and emptying, its state before the inflation.

9. The motor vehicle seat arrangement according to claim 1, wherein the two inflatable elements are arranged such that they are able to exert the momentum on the vehicle occupant in substantially the same direction.

10. The motor vehicle seat arrangement according to claim 1, wherein the two inflatable elements comprise at least one inflatable chamber being designed non gas-tight.

11. The motor vehicle seat arrangement according to claim 1, wherein the two inflatable elements are arranged exclusively in or on the side wall of the backrest of the vehicle seat such that no inflatable elements are arranged in the seating area of the vehicle seat.

12. The motor vehicle seat arrangement according to claim 1, wherein the material core is covered by a seat cover.

\* \* \* \* \*